United States Patent
Ikuta et al.

(10) Patent No.: US 7,108,214 B2
(45) Date of Patent: Sep. 19, 2006

(54) DRAG CONTROL MEMBER ATTACHMENT STRUCTURE

(75) Inventors: Tekeshi Ikuta, Sakai (JP); Ken'ichi Kawasaki, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/288,232

(22) Filed: Nov. 29, 2005

(65) Prior Publication Data
US 2006/0138267 A1   Jun. 29, 2006

(30) Foreign Application Priority Data
Dec. 27, 2004   (JP) ............................. 2004-377732
Mar. 10, 2005   (JP) ............................. 2005-068012

(51) Int. Cl.
*A01K 89/01*   (2006.01)
(52) U.S. Cl. ...................... 242/246; 242/303; 242/304
(58) Field of Classification Search ................ 242/246, 242/295, 303, 304
See application file for complete search history.

(56) References Cited

U.S. PATENT DOCUMENTS 5,118,048 A * 6/1992 Childre et al. .............. 242/245
6,511,007 B1 * 1/2003 Matsuura .................... 242/290
6,805,313 B1 * 10/2004 Nilsen ........................ 242/303

FOREIGN PATENT DOCUMENTS

JP      11-009157      1/1999

* cited by examiner

*Primary Examiner*—Emmanuel M Marcelo
(74) *Attorney, Agent, or Firm*—Global IP Counselors, LLP

(57) ABSTRACT

A drag control member attachment structure for a lever-drag type reel has a first cam member, a second cam member, a guiding portion, a guide fastening portion and a pivot support portion. The pivot support portion is disposed on an outer periphery side of the guide fastening portion. The second cam member engages with the first cam member and moves in a pivot axis direction in response to pivoting of the first cam member. The guiding portion has a cylindrical section and a hexagonal section that non-rotatably and movably guides the second cam member in the pivot axis direction. The guide fastening portion includes a hexagonal recessed section that is disposed on a side of the reel unit and receives the hexagonal section. The guide fastening portion further includes a through hole that receives the cylindrical section.

6 Claims, 12 Drawing Sheets

DRAG CONTROL MEMBER ATTACHMENT STRUCTURE

CROSS-REFERENCE TO RELATED APPLICATIONS

This application claims priority to Japanese Patent Application Nos. 2004-377732 and 2005-68012. The entire disclosures of Japanese Patent Application Nos. 2004-377732 and 2005-68012 are hereby incorporated herein by reference.

BACKGROUND OF THE INVENTION

1. Field of the Invention

The present invention generally relates to an attachment structure. More specifically, the present invention relates to an attachment structure of a drag control member of a lever drag reel that adjusts a drag force of a drag mechanism.

2. Background Information

A lever-drag reel is known to have a reel that is capable of adjusting drag force by moving a spool shaft in an axial direction by a drag control member that is pivotably attached on the spool shaft. (See, for example, Japanese Publication No. H11-9157.) A base end of this of type drag control member is pivotably supported by a pivot support portion that is formed in a cover member of a reel unit so as to concentrically protrude with the spool shaft. In addition, the base end of the drag control member is provided with a cam mechanism that moves in the axial direction in response to its pivoting. The cam mechanism has a first cam provided in the drag control member and a second cam that engages with the first cam. The second cam moves in a direction of the pivot axis (spool shaft) in response to the pivoting of the drag control member. A guiding portion for non-rotatably and axially movably mounting the second cam is provided in an inner periphery side of the pivot support portion of the reel unit. In order to distributively receive the force of the rotary direction on a number of surfaces, the guiding portion is integrally formed in a hexagonal appearance on the inner periphery side of the pivot support portion with the pivot support portion.

In the case where the cover member of the reel unit is formed by forging, the guiding portion, with the hexagonal appearance, is formed at the same time in formation of the cover member. However, in the case where the reel unit such as the cover member is formed in a metal machining process, the cost of processing is high when the guide member is formed integrally with it by a cutting process. Accordingly, it is conceivable to fasten the guiding portion that is formed separately from the reel unit to the reel unit by crimp fastening. In this case, since the guiding portion should non-rotatably guide the second cam, it is necessary to non-rotatably fasten the guiding portion to the reel unit. Accordingly, it is conceivable to non-rotatably fasten the guiding portion to the reel unit by using the hexagonal appearance. In this case, a hexagonal recessed portion is formed and the guiding portion engages with it. When the hexagonal recessed portion is formed by a machining process with a tool, it is difficult to form a precise hexagon since such a tool for forming the recessed portion is a cylindrical tool (e.g. end mill). For this reason, the number of contact parts between an inner peripheral surface of the recessed portion and an outer periphery surface of the guiding portion varies and is unstable. When the number of these contact parts decreases, a load is concentratedly applied in proximity to a corner of the hexagonal shape. Thus, the part deforms. This may cause wobbling of the fastened part.

In view of the above, it will be apparent to those skilled in the art from this disclosure that there exists a need for an improved drag control member attachment structure to reduce variation of contact parts between a hexagonal guiding portion and a reel unit. This invention addresses this need in the art as well as other needs, which will become apparent to those skilled in the art from this disclosure.

SUMMARY OF THE INVENTION

A drag control member attachment structure according to a first aspect of the present invention is an attachment structure that includes a first cam member, a second cam member, a guiding portion, a guide fastening portion and a pivot support portion. The first cam member includes a drag control member attachment part. The second cam member is configured to engage with the first cam member and move in a pivot axis direction in response to pivoting of the first cam member. The guiding portion includes a hexagonal section having first through sixth outer peripheral surfaces that non-rotatably and movably guide the second cam member in the pivot axis direction. The guide fastening portion includes a hexagonal recessed section that receives the hexagonal section of the guiding portion. The hexagonal section includes first through sixth inner peripheral surfaces. The first and fourth inner peripheral surfaces are spaced at intervals from the first outer peripheral surface and the fourth outer peripheral surface opposing the first outer peripheral surface, respectively. The second inner peripheral surface has a first contact part and a first separated part. The first contact part is configured and arranged to be in contact with a first part on a side of the second outer peripheral surface adjacent to the first outer peripheral surface. The first separated part is disposed on a second part of a side adjacent to the second outer peripheral surface so as to be spaced at an interval away from the second outer peripheral surface. The third and sixth inner peripheral surfaces are configured and arranged to be in contact with the third outer peripheral surface and the sixth outer peripheral surface opposing the third outer peripheral surface. The fifth inner peripheral surface has a second contact part and a second separated part. The second contact part is configured and arranged to be in contact with a third part on a side of the fifth outer peripheral surface adjacent to the fourth outer peripheral surface. The second separated part is disposed on a fourth part of a side adjacent to the fifth outer peripheral surface so as to be spaced at an interval away from the fifth outer peripheral surface. The first through sixth inner peripheral surfaces are arranged along the pivoting direction.

With this attachment structure, the guiding portion is fastened to the guide fastening portion formed in the reel unit side. The second cam member is attached non-rotatably and axially movably to the fastened guiding portion. A drag control member is pivotably attached to the pivot support portion that is disposed on the outer periphery side of the guiding portion. When the drag control member pivots, the first cam member pivots, and the second cam member moves in the axial direction. The drag length is adjusted by transmitting movement of the second cam member to a spool shaft or spool. When the drag control member is operated to move the spool shaft or spool toward a direction that increases the drag force, large force is also applied between the first and second cam members in the pivoting direction. On the other hand, when drag control member is operated toward the opposite direction, the applied force in the pivoting direction is not as large.

It is difficult to form a recessed part with a precise hexagon because the hexagonal recessed section is formed by a tool that is usually in a cylindrical shape. Accordingly, in the present invention, the first and fourth inner peripheries of the hexagonal recessed section are separated away from the outer peripheral surface of the hexagonal guiding portion. Thus, these parts do not serve to stop rotation. In addition, the second and fifth inner peripheries adjacent to the first and the fourth inner peripheries define the first and second contact parts on the first and fourth inner periphery sides that are in contact with the first and third parts of the second and fifth outer peripheries. The second and fifth inner peripheries define the first and second separated part on the third and sixth inner peripheries sides that are separated away from the second and fifth outer peripheries. The third and sixth inner peripheries adjacent to the second and fifth inner peripheries are in contact with third and sixth inner peripheries. In this case, the first and fourth inner peripheries are separated away from the first and second outer peripheries and the first and second separated parts are provided on the second and fifth inner peripheries. Thus, even if a cylindrical tool is used, such a tool can be relieved to these parts. The first and second contact parts and the third and sixth inner peripheries can be precisely formed along the first and third parts of the second and fifth outer peripheries and the third and sixth outer peripheries of the hexagon by a machining process. Additionally, the first and second contact parts are disposed on the upstream side of the pivoting direction where the larger force is applied on the guiding portion. As a result, when the drag control member is operated to pivot in this direction, the number of contact parts that contact the guiding portion is greater than the number of contact parts in the case of the opposite direction.

Specifically, when the drag control member is operated in the direction that increases the drag force, total four parts that include the first and second contact parts and two parts of the third and sixth inner peripheries on the second and fifth inner periphery sides come in contact with the outer peripheral surface of the guiding portion. On the other hand, when it is operated to pivot in the opposite direction, only two parts of the third and sixth inner peripheries on the fourth and first inner periphery sides come in contact with the outer peripheral surface of the guiding portion. Therefore, the number of the contact parts is stable. Thus, it is possible to reduce variation of the contact parts between the hexagonal guiding portion and the reel unit.

According to an attachment structure of a second aspect of the present invention, in the structure according to the first aspect of the present invention, the first cam member has a plurality of cam pins that are arranged along the radial direction of the pivot axis, and the second cam member includes a slant cam having an inclined surface that is inclined along with the circumferential direction so as to engage with the cam pins, and a hexagonal hole that is disposed in the inner periphery thereof and engages movably in the axial direction and non-rotatably with the guide portion. In this case, the first cam member is configured of the cam pin that is provided in the circumferential portion where the drag control member is not provided, and the second cam member is configured of the inclined surface that is formed along the circumferential direction so as to engage with it. Therefore, it is possible to simplify the cam structure as compared with the case where both members are configured of inclined surfaces.

According to an attachment structure of a third aspect of the present invention, in the structure according to the second aspect of the present invention, the hexagonal section further includes first through sixth arc-shaped parts that connect adjacent the outer peripheral surfaces of the first through sixth outer peripheral surfaces with arcs centered at the center of the pivot axis. The second cam further includes a circular hole that is formed on the inner periphery thereof adjacent to the hexagonal hole and can receive the arc-shaped part fitted therein. In this case, even in the case where the hexagonal hole is formed in short length by press forming, the first through sixth arc-shaped parts can be fitted in the circular hole. Therefore, it is possible to suppress wobbling of the second cam member.

According to an attachment structure of a fourth aspect of the present invention, in the structure according to any of the first through third aspects of the present invention, the first separated part of the second inner peripheral surface and the second separated part of the fifth inner peripheral surface are formed in arc shapes, respectively. In this case, when the hexagonal recessed section is formed by means of a cylindrical tool, the first and second separated parts can be easily formed.

According to an attachment structure of a fifth aspect of the present invention, in the structure according to any of the first through fourth aspects of the present invention, the cylindrical section of the guiding portion includes a crimp section that is configured to pass through the through hole and protrude inwardly of the reel unit, and to have a tapered surface with its inner peripheral surface expands toward its end. The guiding portion is crimp-fastened to the reel unit by crimping the crimp section that protrudes from the through hole toward the inner wall of the reel unit. In this case, since the guiding portion is fastened to the reel unit by crimp-fastening, it is possible to simplify the fastening structure of the guiding portion as compared with a fastening structure by a screw, or the like.

According to the present invention, the first and fourth inner peripheries are separated away from the first and second outer peripheries, and the first and second separated parts are provided on the second and fifth inner peripheries. Thus, even if a cylindrical tool is used, such a tool can be relieved from these parts. The first and second contact parts, and the third and sixth inner peripheries are precisely formed along the first and second parts of the first and fourth outer peripheries, and the third and sixth outer peripheries of the hexagon by a machining process. Additionally, the first and second contact parts are disposed on the upstream side of the pivoting direction of the second and fifth inner peripheries where the larger force is applied on the guiding portion. As a result, when the drag control member is operated to pivot in this direction, the number of the contact parts that contact the drag control member is greater than the number of the contact parts in the case of the opposite direction.

Specifically, when the drag control member is operated in the direction that increases the drag force, total four parts that include the first and second contact parts and two parts of the third and sixth inner peripheries on the second and fifth inner periphery sides come in contact with the outer peripheral surface of the guiding portion. On the other hand, when it is operated to pivot in the opposite direction, only two parts of the third and sixth inner peripheries on the fourth and first inner periphery sides come in contact with the outer peripheral surface of the guiding portion. Therefore, the number of the contact parts is stable. Thus, it is possible to reduce variation of the contact parts between the hexagonal guiding portion and the reel unit.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

A selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 1:
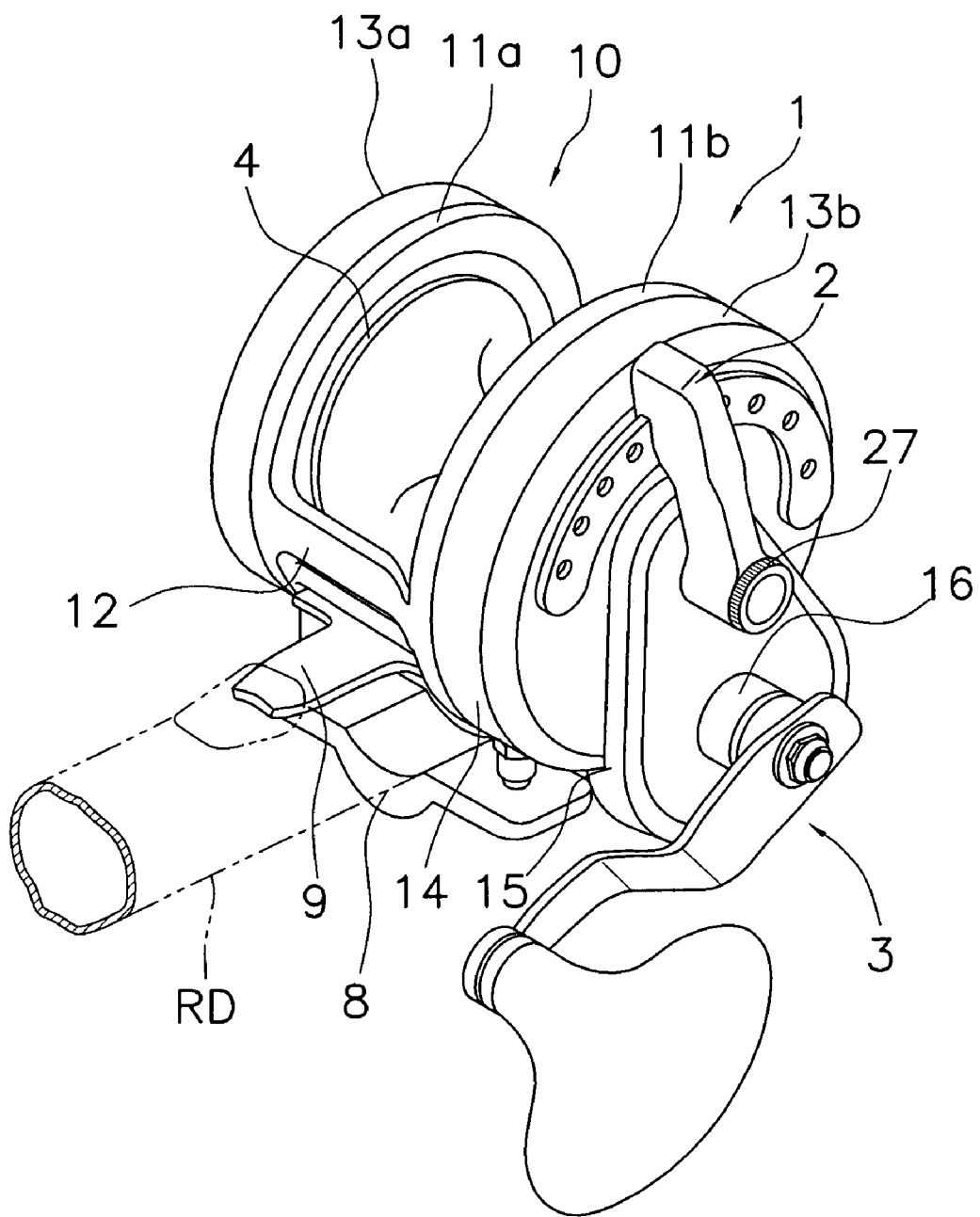
FIG. 1 is a perspective view of a dual-bearing reel according to an embodiment of the present invention.
Figure 2:
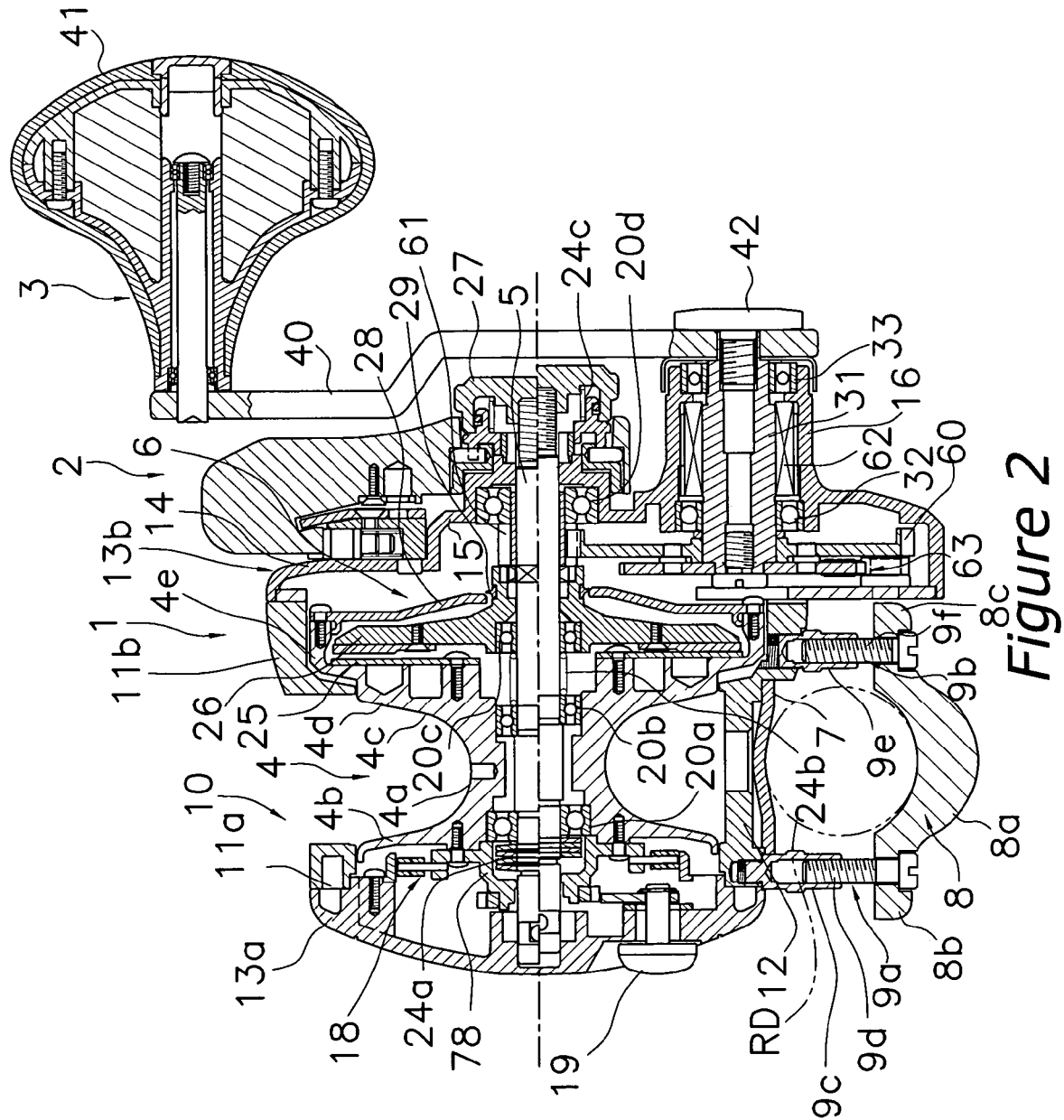
FIG. 2 is a cross-sectional view of the dual-bearing reel illustrated in FIG. 1 in accordance with the embodiment of the present invention.

Referring initially to FIGS. 1 and 2, a dual-bearing reel is illustrated in accordance with a first embodiment of the present invention. The dual-bearing reel is a medium sized lever-drag type reel and includes a reel unit 1, a drag control member 2, a handle 3 and a spool 4. The drag control member 2 is pivotally provided on a side of the reel unit 1. The handle 3 is rotatably supported by the reel unit 1 below the drag control member 2. The spool 4 is provided inside the reel unit 1.

The reel unit 1 has a frame 10 and first and second side covers 13a and 13b that cover sides of the frame 10. The frame 10 has first and second side plates 11a and 11b on left and right sides, respectively, of the frame 10. A plurality of connectors 12 connects the first and second side plates 11a and 11b. The first and second side plates 11a and 11b have a substantially round shape when viewed laterally. The second side plate 11b is formed so that a diameter thereof is larger than a diameter of the first side plate 11a. For example, the diameter of the second side plate 11b is in a range between about 110% or greater and about 140% or lower of the diameter of the first side plate 11a. In this embodiment, it is preferably about 110% to 120% of the diameter of the first side plate 11a. The connectors 12 are integrally formed with the first and second side plates 11a and 11b. A metal rod-mounting leg 7 extends in a longitudinal direction and serves to mount the reel unit 1 onto a fishing rod RD. The rod-mounting leg 7 is secured to a lower connector 12, as shown in FIGS. 1 and 2.

Referring to FIG. 2, the rod-mounting leg 7 is provided with a rod clamp 8. The rod-mounting leg 7 and the rod clamp 8 oppose each other. The fishing rod RD is between the rod-mounting leg 7 and the rod clamp 8. The rod clamp 8 is a metal member that has an arc-shaped portion 8a and a pair of attachment portions 8b and 8c extending from sides of the arc-shaped portion 8a. The rod clamp 8 is secured to the lower connector 12 by first and second clamp members 9a and 9b. The first and second clamp members 9a and 9b have first and second clamp nuts 9c and 9e and first and second clamp bolts 9d and 9f. The first and second clamp bolts 9d and 9f threadedly engage with the first and second clamp nuts 9c and 9e, respectively. The first and second clamp nuts 9c and 9e are screwed in the connector 12. Accordingly, the first and second clamp members 9a and 9b are attached to the attachment portions 8b and 8c.

Because of the larger diameter of the second side plate 11b, a connection part of the connector 12 is connected to the second side plate 11b lower than a connection part that is connected to the first side plate 1 a toward the fishing rod RD side. Thus, a distance between the connector 12 and the attachment portion 8c of the rod clamp 8 on the second side plate 11b side is shorter. For this reason, the second clamp member 9b on the second side plate side 11b has a shorter length as compared with the first clamp member 9a on the first side plate 11a side. Specifically, the clamp nuts 9c and 9e have the same length but the clamp bolt 9f is shorter than the clamp bolt 9d.

Figure 4:
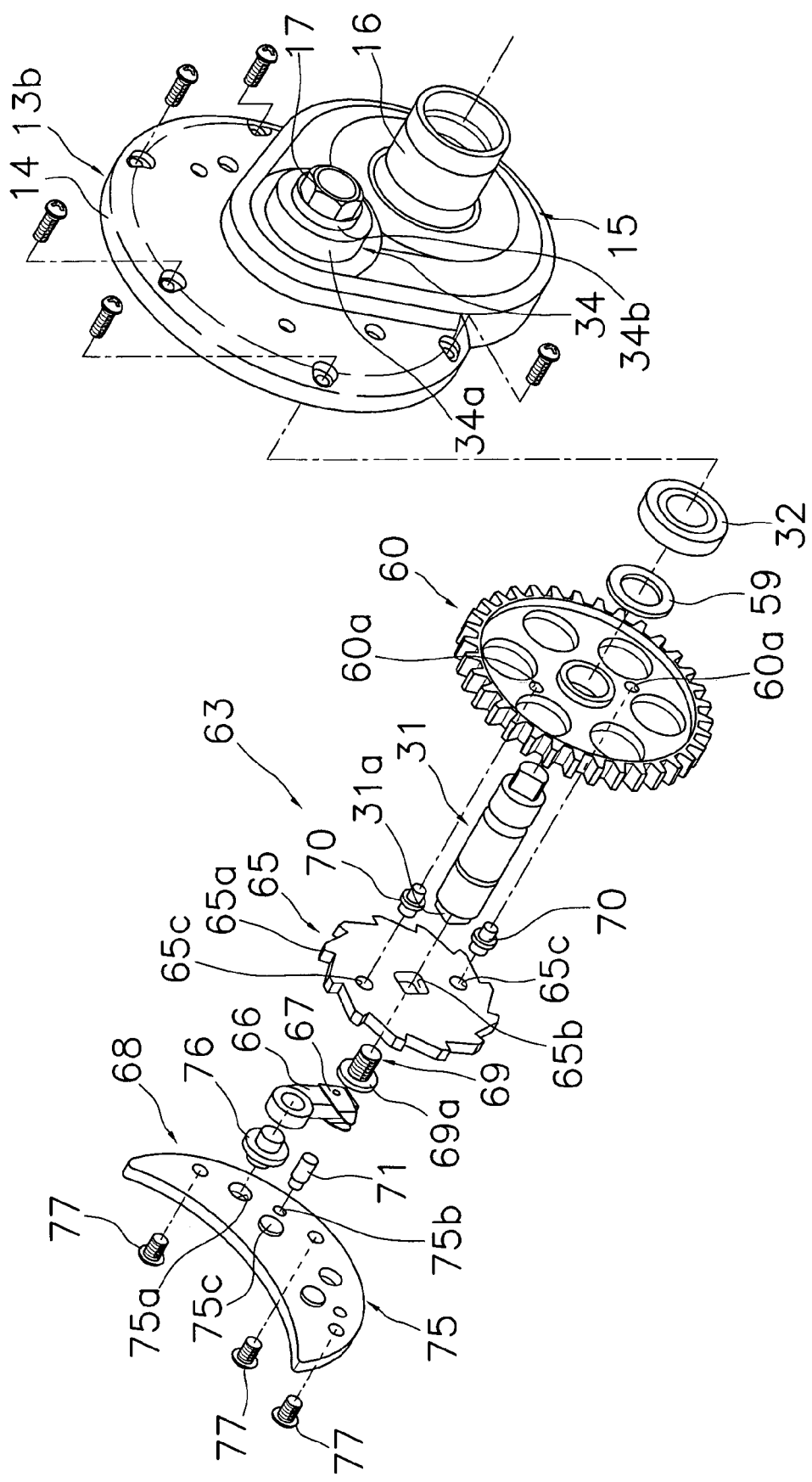
FIG. 4 is an exploded perspective view of the second one-way clutch illustrated in FIGS. 2 and 3 in accordance with the embodiment of the present invention.

The first side cover 13a is mounted to a side of the first side plate 11a. The first side cover 13a has a substantially round shape when viewed laterally, as shown in FIGS. 1 and 2. The second side cover 13b has a cylindrical portion 14 and a bulging portion 15, as shown in FIGS. 1, 2 and 4. The cylindrical portion 14 is mounted to a side of the second side plate 11b. The bulging portion 15 bulges axially outwardly of the cylindrical portion 14 (right side in FIG. 2). The cylindrical portion 14 has a substantially round shape when viewed laterally. The first and second side covers 13a and 13b have substantially the same diameters as the first and second side plates 11a and 11b, respectively. The second side cover 13b is formed so that the diameter of the second side cover 13b is larger than the diameter of the first side cover 13a. For example, the diameter of the cylindrical portion 14 of the second side cover 13b is in a range between about 110% or greater and about 140% or lower of the diameter of the first side cover 13a. In this embodiment, it is preferably about 110% to 120% of the diameter of the first side cover 13a.

The bulging portion 15 is integrally formed with the cylindrical portion 14. The bulging portion 15 defines a space with an inside communicated to the cylindrical portion 14. The bulging portion 15 has a substantially teardrop shape when viewed laterally with a smaller arc-shaped section and a larger arc-shaped section. The larger arc-shaped section protrudes downwardly with respect to the cylindrical portion 14. The drag control member 2 and the handle 3 are mounted to the bulging portion 15 so that they are outwardly exposed.

As shown in FIG. 4, a pivot support portion 34 for pivotably supporting the drag control member 2 is formed in an attachment part of the bulging portion 15 so as to protrude outwardly in a stepped fashion. The pivot support portion 34 has a large diameter protruding portion 34a and a small diameter protruding portion 34b that protrudes from the large diameter protruding portion 34a. A guide member or guiding portion 17 is disposed on an inner periphery at a side of the pivot support portion 34. Specifically, the guiding portion 17 is disposed in the small diameter protruding portion 34b. The guiding portion 17 is crimp-fastened to a guide fastening portion 39 disposed on the inner periphery side of the pivot support portion 34. The spool shaft 5 passes through the guide fastening portion 39 and the second side cover 13b. The guide fastening portion 39 has a hexagonal recessed section 37 that is arranged concentrically with the center of the spool shaft. The recessed section 37 non-rotatably engages with the guiding portion 17 and a circular through hole 38, as shown in FIG. 8.

Figure 8:
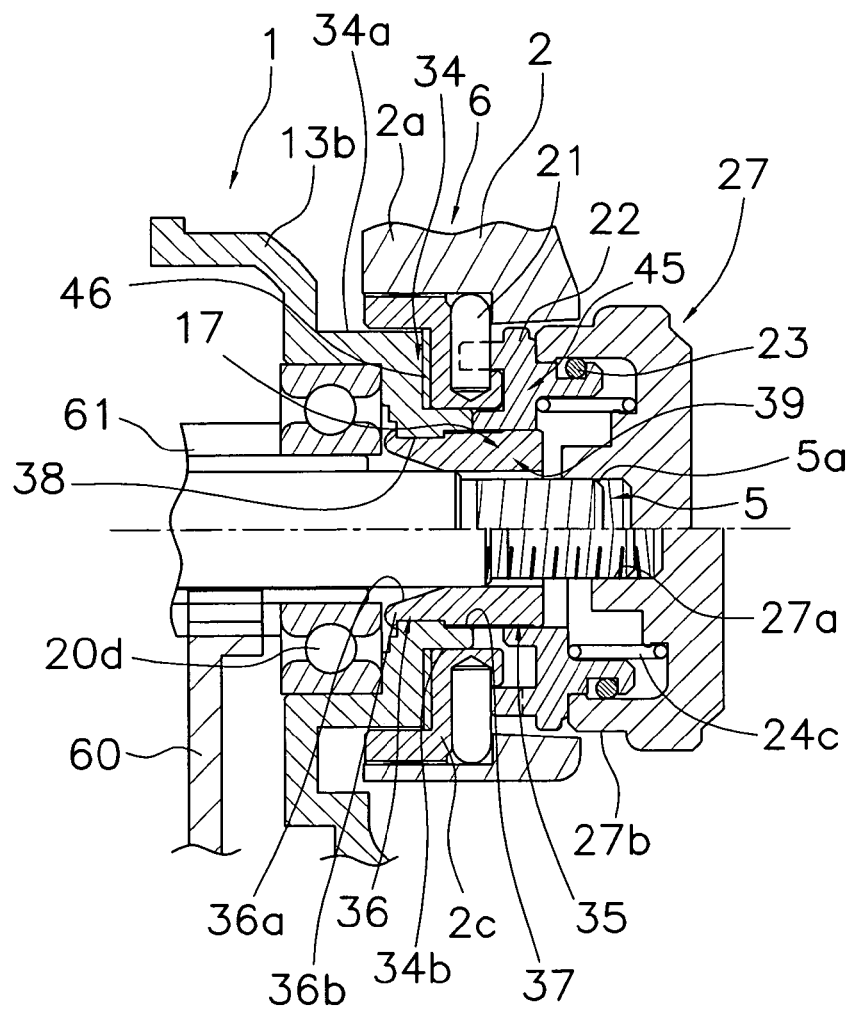
FIG. 8 is an enlarged cross-sectional view of a drag adjustment member of the drag mechanism of the dual-bearing reel illustrated in FIG. 7 in accordance with the embodiment of the present invention.
Figure 9:
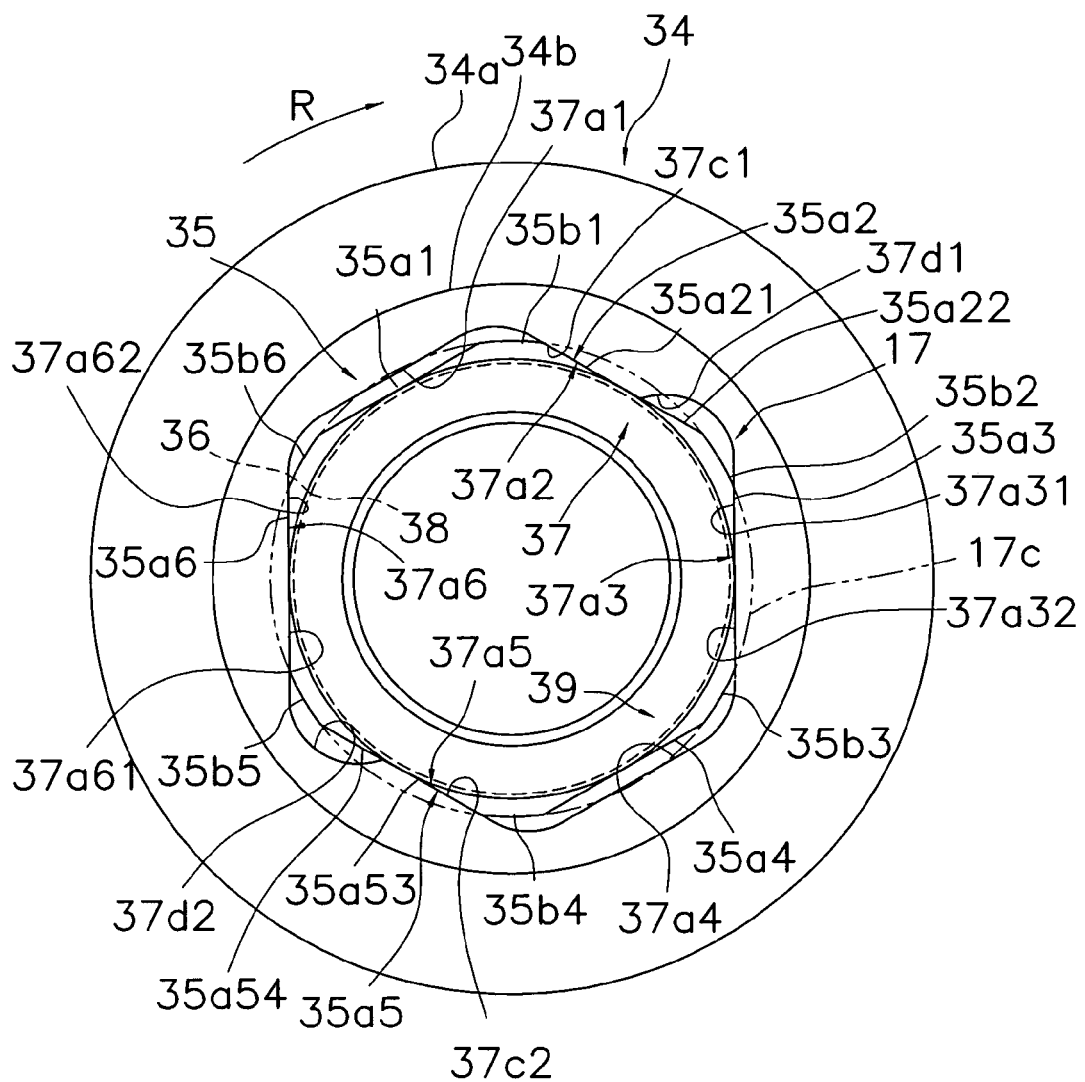
FIG. 9 is a front view of a guide member of the dual-bearing reel illustrated in FIG. 8 in accordance with the embodiment of the present invention.

As shown in FIGS. 8 and 9, the guiding portion 17 includes a hexagonal section 35 that has a substantially hexagonal outside shape in cross-section. The hexagonal section 35 is fitted in the hexagonal recessed section 37. The guiding portion 17 further includes a cylindrical section 36 with a diameter smaller than an inscribed circle of the hexagonal recessed section 37 and is fitted in the through hole 38. The hexagonal section 35 has first through sixth outer peripheral surfaces 35a1–35a6 and first through sixth arc-shaped parts 35b1–35b6. The first through sixth arc-shaped parts 35b1–35b6 connect adjacent the first through sixth outer peripheral surfaces 35a1–35a6 with arcs centered at the center of a pivot axis (the center of the spool shaft 5). The first through sixth outer peripheral surfaces 35a1–35a6 are disposed on an outer periphery of the hexagonal section 35 that are edges of a regular hexagon, for example. The cylindrical section 36 is configured to be fitted in the through hole 38 for centering the guiding portion 17 relative to the spool shaft 5. The cylindrical section 36 includes a tapered surface 36a and a crimp section 36b. The crimp section 36b is configured to pass through the through hole 38 and protrude inwardly of the second side cover 13b. The tapered surface 36a has an inner peripheral surface that expands toward an end of the cylindrical section 36. The guiding portion 17 is crimp-fastened to the second side cover 13b by crimping the crimp section 36b that protrudes from the through hole 38 toward an inner wall of the second side cover 13b.

As shown in FIG. 9, the hexagonal recessed section 37 has first through sixth inner peripheral surfaces 37a1–37a6. The first and fourth inner peripheral surfaces 37a1 and 37a4 are spaced at intervals from the first outer peripheral surface 35a1 and the fourth outer peripheral surface 35a4, respectively. The fourth outer peripheral surface 35a4 opposes the first outer peripheral surface 35a1. The second inner peripheral surface 37a2 has a first contact part 37c1 that is disposed so as to be able to contact a first part 35a21 on a first outer peripheral surface side of the second outer peripheral surface 35a2 adjacent to the first outer peripheral surface 35a1. The second inner peripheral surface 37a2 has a first separated part 37d1 that is disposed on a second part 35a22 of a third outer peripheral surface 35a3 side adjacent to the second outer peripheral surface 35a2 so as to be spaced at an interval away from the second outer peripheral surface 35a2. The third and sixth inner peripheral surfaces 37a3 and 37a6 are disposed so as to contact the third and sixth outer peripheral surfaces 35a3 and 35a6, respectively. The sixth outer peripheral surface 35a6 opposes the third outer peripheral surface 35a3. The fifth inner peripheral surface 37a5 has a second contact part 37c2 that is disposed so as to contact a third part 35a53 on the fourth outer peripheral surface side of the fifth outer peripheral surface 35a5 adjacent to the fourth outer peripheral surface 35a4. The fifth inner peripheral surface 37a5 has a second separated part 37d2 that is disposed on a fourth part 35a54 of the sixth outer peripheral surface side adjacent to the fifth outer peripheral surface 35a5 so as to be spaced at an interval away from the fifth outer peripheral surface 35a5. The first through sixth inner peripheral surfaces 37a1–37a6 are arranged along the pivoting direction that increases the drag force when the drag control member 2 is pivoted, as shown by an arrow R in FIG. 9. The first and second separated parts 37d1 and 37d2 are formed in an arc shape and are connected to the third and sixth inner peripheral surfaces 37a3 and 37a6.

Referring to FIGS. 1–4, a protruding tube 16 for mounting the handle 3 is formed so as to protrude outwardly under the drag control member 2. Inside the protruding tube 16, a cylindrical handle shaft 31 is arranged in parallel to the spool shaft 5. The handle shaft 31 is a rotary shaft of the spool 4. The handle shaft 31 is rotatably cantilevered in the protruding tube 16 by two bearings 32 and 33. The bearings 32 and 33 are arranged at ends of the protruding tube 16. The handle shaft 31 has a rotation interlocking portion 31a and a shaft end portion 31b. The rotation interlocking portion 31a is formed in a non-round shape such as a rectangular shaped cross-section is formed at the shaft end portion 31b. The shaft end portion 31b of the handle shaft 31 protrudes inwardly from the bearing 32. A main gear 60 is mounted rotatably on the shaft end portion 31b. A pair of rotation transmission holes 60a is formed in a disk portion of the main gear 60. The main gear 60 is in contact with the bearing 32 via a washer 59.

A roller type first one-way clutch 62 is provided between the bearings 32 and 33. The first one-way clutch 62 allows only normal rotation of the handle shaft 31 in the line winding direction, but prevents reverse rotation in the line reel-out direction. Moreover, a pawl type second one-way clutch 63 is provided at the shaft end portion 31b of the handle shaft 31. The second one-way clutch 63 also prevents reverse rotation of the handle shaft 31. The first and second one-way clutches 62 and 63 are mainly used to operate a drag mechanism 6 that brakes rotation of the spool 4 in the line reel-out direction.

Referring to FIGS. 2–6, the second one-way clutch 63 has a ratchet wheel 65, a ratchet pawl 66, an urging member 67, a pawl support portion 68 and a fixing bolt 69. The ratchet wheel 65 is arranged on the rotation interlocking portion 31a of the handle shaft 31 so as to align with the main gear 60 for cooperation with the main gear 60. The ratchet wheel 65 is further arranged with a gap between the main gear 60 and the ratchet wheel 65. The ratchet pawl 66 is located on an outer periphery of the ratchet wheel 65. The urging member 67 urges the ratchet pawl 66. The pawl support portion 68 pivotably supports the ratchet pawl 66. The fixing bolt 69 secures the ratchet wheel 65 on the handle shaft 31.

Figure 5:
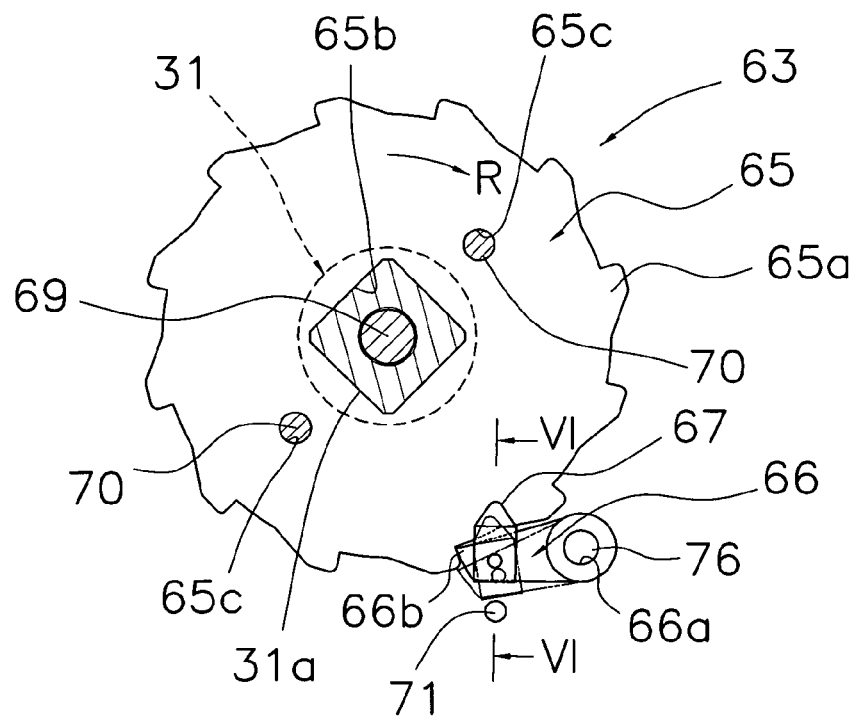
FIG. 5 is a front view of the second one-way clutch illustrated in FIGS. 2–4 in accordance with the embodiment of the present invention.

Referring to FIGS. 4 and 5, the ratchet wheel 65 has a plurality of circumferentially spaced saw shape type teeth 65a formed on the outer periphery of the ratchet wheel 65. The ratchet wheel 65 is a substantially disk-shaped member with a smaller diameter than a diameter of the main gear 60. The ratchet wheel 65 includes a rectangular mounting hole 65b and a pair of rotation transmission holes 65c. The rectangular mounting hole 65b engages the rotation interlocking portion 31a of the handle shaft 31. The rectangular mounting hole 65b is formed at a center of the ratchet wheel 65. The pair of rotation transmission holes 65c goes through an entire width of the ratchet wheel 65. The rotation transmission holes 65c are formed at locations that oppose the rotation transmission holes 60a of the main gear 60. A pair of connection pins 70 connect the rotation transmission holes 60a of the main gear 60 and the rotation transmission holes 65c of the ratchet wheel 65. The connection pins 70 are provided between the main gear 60 and the ratchet wheel 65. The connection pins 70 are inserted into both the rotation transmission holes 60a and 65c in order to provide a configuration that transmits rotation of the ratchet wheel 65, i.e., the rotation of the handle shaft 31, to the main gear 60 via the connection pins 70. The ratchet wheel 65 is secured onto the handle shaft 31 by the fixing bolt 69. The fixing bolt 69 is screwed into the shaft end portion 31b of the handle shaft 31. The fixing bolt 69 urges the main gear 60 via the ratchet wheel 65. The main gear 60 is in contact with the inner race of the bearing 32 via the washer 59. As a result, the main gear 60 is also positioned and secured by the fixing bolt 69.

Referring to FIG. 5, the ratchet pawl 66 is pivotably mounted to the pawl support portion 68 between a contact position, shown by a solid line, in which the ratchet pawl 66 contacts the teeth 65a and a separated position, shown by a phantom line, in which the ratchet pawl 66 is parted away from the teeth 65a. When the ratchet pawl 66 is positioned in the contact position, the rotation of the handle shaft 31 in the line reel-out direction is prevented. Thus, when the spool 4 rotates in the line reel-out direction, the drag mechanism 6 will operate. The ratchet pawl 66 has a support hole 66a into which a pivoting support pin 76 is fitted. The tip 66b of the ratchet pawl 66 is disposed downstream from the support hole 66a in the line winding direction R of the ratchet wheel 65. The main gear 60 restricts axial movement and flexure of the ratchet pawl 66 toward the main gear 60.

Figure 6:
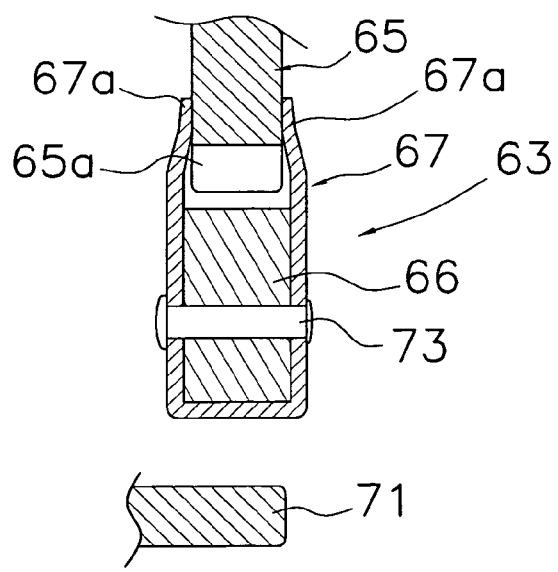
FIG. 6 is a cross-sectional view of a ratchet pawl of the second one-way clutch taken along VI—VI in FIG. 5 in accordance with the embodiment of the present invention.

The urging member 67 is a resilient, metal, plate-shaped member that is bent in a C-shape. An intermediate part of the ratchet pawl 66 is inserted into the urging member 67. The urging member 67 is secured by a crimped pin 73, for example. A pair of tips 67a of the urging member 67 grasps the ratchet wheel 65 by resiliently contacting both lateral surfaces of the ratchet wheel 65, as shown in FIG. 6. A restriction pin 71 for restricting a pivot range of the ratchet pawl 66 is disposed on the pawl support portion 68 on the separated position side of the ratchet pawl 66. The restriction pin 71 prevents the urging member 67 from being detached from the ratchet wheel 65.

When the ratchet wheel 65 rotates in the line winding direction R, the urging member 67 urges the ratchet pawl 66 into the separated position by friction with the ratchet wheel 65. The ratchet pawl 66 adjoins the restriction pin 71 and is held in the separated position. Accordingly, when line is wound, the ratchet pawl 66 no longer contacts the teeth 65a on the ratchet wheel 65 in order to suppress noise. The non-contact position of the ratchet pawl 66 curbs an increase in rotational resistance and curbs degradation of a reeling-in efficiency of the spool 4 as well. Again, rotating the ratchet wheel 65 in the reverse direction of the line reel-out direction urges the ratchet pawl 66 into a contact position under friction with the ratchet wheel 65. As a result, it is possible to prevent the rotation of the handle shaft 31 in the line reel-out direction.

The pawl support portion 68 has a fixing bracket 75 that is detachably secured to an interior side surface of the bulging portion 15 by screw members 77, for example. The pivot support pin 76 is disposed between the ratchet wheel 65 and the fixing bracket 75. The pivot support pin 76 pivotably supports the ratchet pawl 66. The ratchet pawl 66 is disposed on the pivot support pin 76 such that the ratchet pawl 66 is capable of being pulled from and slipped over the pivot support pin 76 on a side of the pivot support pin 76 nearest the ratchet wheel 65. The fixing bracket 75 is formed in a crescent shape in order to expose a head 69a of the fixing bolt 69. Thus, after the fixing bracket 75 is secured to the bulging portion 15, the fixing bolt 69 is attached. The fixing bracket 75 includes a first fixing hole 75a into which the pivoting support pin 76 is crimp-fastened and a second fixing hole 75b into which the restriction pin 71 is crimp-fastened. In addition, the fixing bracket 75 further includes a flexure prevention protrusion 75c that prevents flexure of the ratchet pawl 66 toward the fixing bracket 75. The flexure prevention protrusion 75c protrudes toward the ratchet pawl 66 from a lateral surface of the fixing bracket 75. The pivoting support pin 76 is a shaft member with a brim having a large diameter in a center of the pivoting support pin 76.

With this second one-way clutch 63 configuration the ratchet pawl 66 with the urging member 67 are in a stationary state together with the ratchet wheel 65 even if the pivot support pin 76 moves near the ratchet wheel 65 and the ratchet pawl 66 moves relative to the ratchet wheel 65. As a result, the urging member 67 does not deform due to the ratchet wheel 65. Therefore, it is possible to suppress deformation of the urging member 67.

Figure 3:
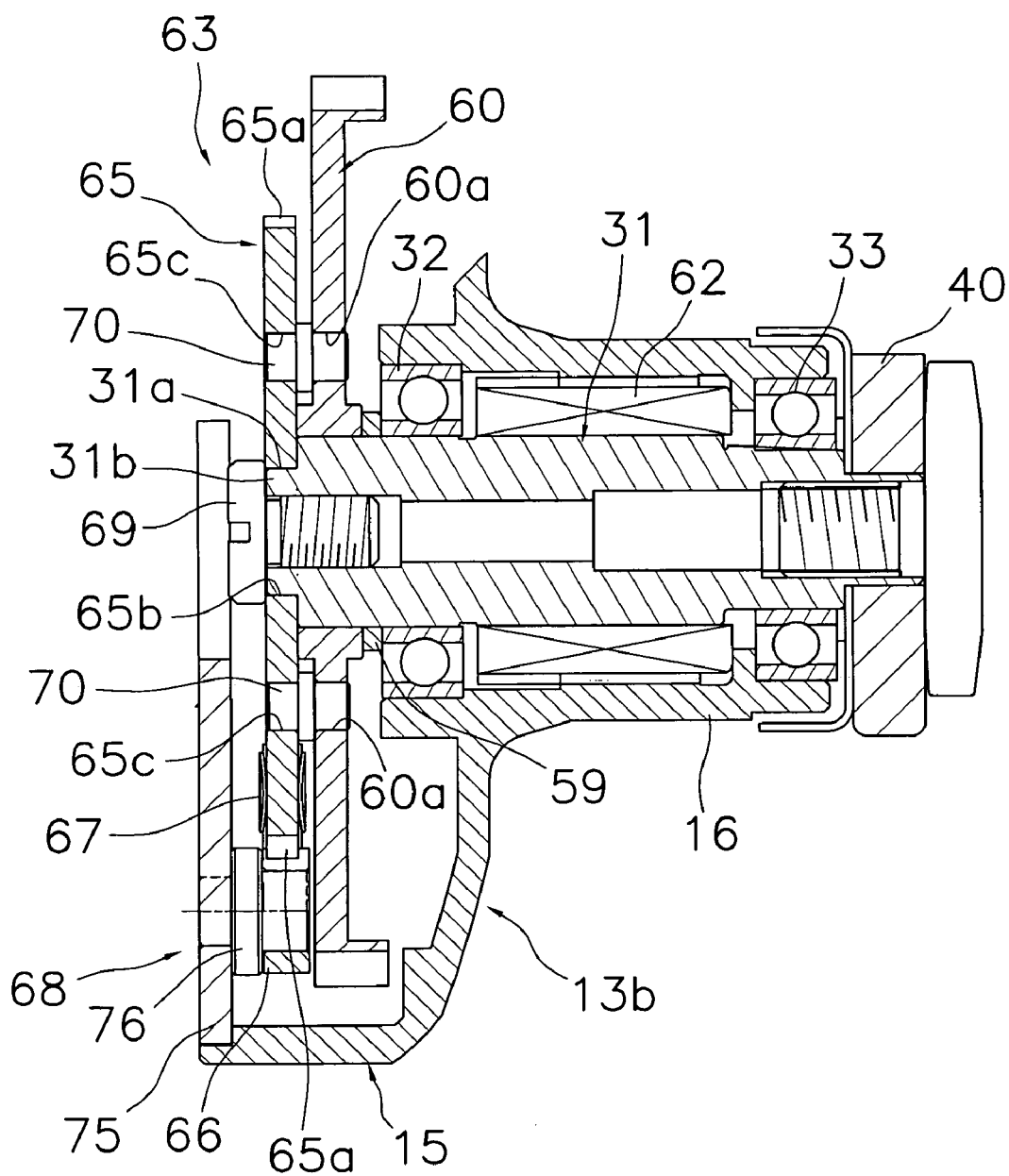
FIG. 3 is an enlarged cross-sectional view of a second one-way clutch of the dual-bearing reel illustrated in FIG. 2 in accordance with the embodiment of the present invention.

Referring to FIGS. 2 and 3, the handle 3 is non-rotatably mounted on a shaft end portion opposite the shaft end portion 31b of the handle shaft 31. The handle 3 includes a handle arm 40 and a handle grip 41. The handle grip 41 is rotatably supported to an end of the handle arm 40. The handle arm 40 is mounted to the shaft end portion opposite the shaft end portion 31b of the handle shaft 31. The handle arm 40 is non-rotatably secured, relative to the handle shaft 31 by a screw member 42. The handle grip 41 is formed in a substantially T-shape with a rounded aspect that facilitates a powering grasp.

As shown in FIG. 2, the spool 4 includes a cylindrical bobbin trunk 4a and first and second flange portions 4b and 4c. The first and second flange portions 4b and 4c each have a diameter larger than the cylindrical bobbin trunk 4a. The first and second flange portions 4b and 4c are formed on sides of the cylindrical bobbin trunk 4a. The spool 4 is rotatably supported on the spool shaft 5 by bearings 20a and 20b. In addition, the drag mechanism 6 that brakes the rotation of the spool 4 in the line reel-out direction is provided on a side of the spool 4 nearest the handle 3. Additionally, a centrifugal braking mechanism 18 that brakes the spool 4 is provided on a side of the spool 4 nearest the first side cover 13a. Moreover, a spool sound generating mechanism 19 is provided between the spool 4 and the first side cover 13a. The spool sound generating mechanism 19 is configured to be switched between a sounding state where sound is generated in response to rotation of the spool 4 and a silent state where sound is not generated.

Figure 7:
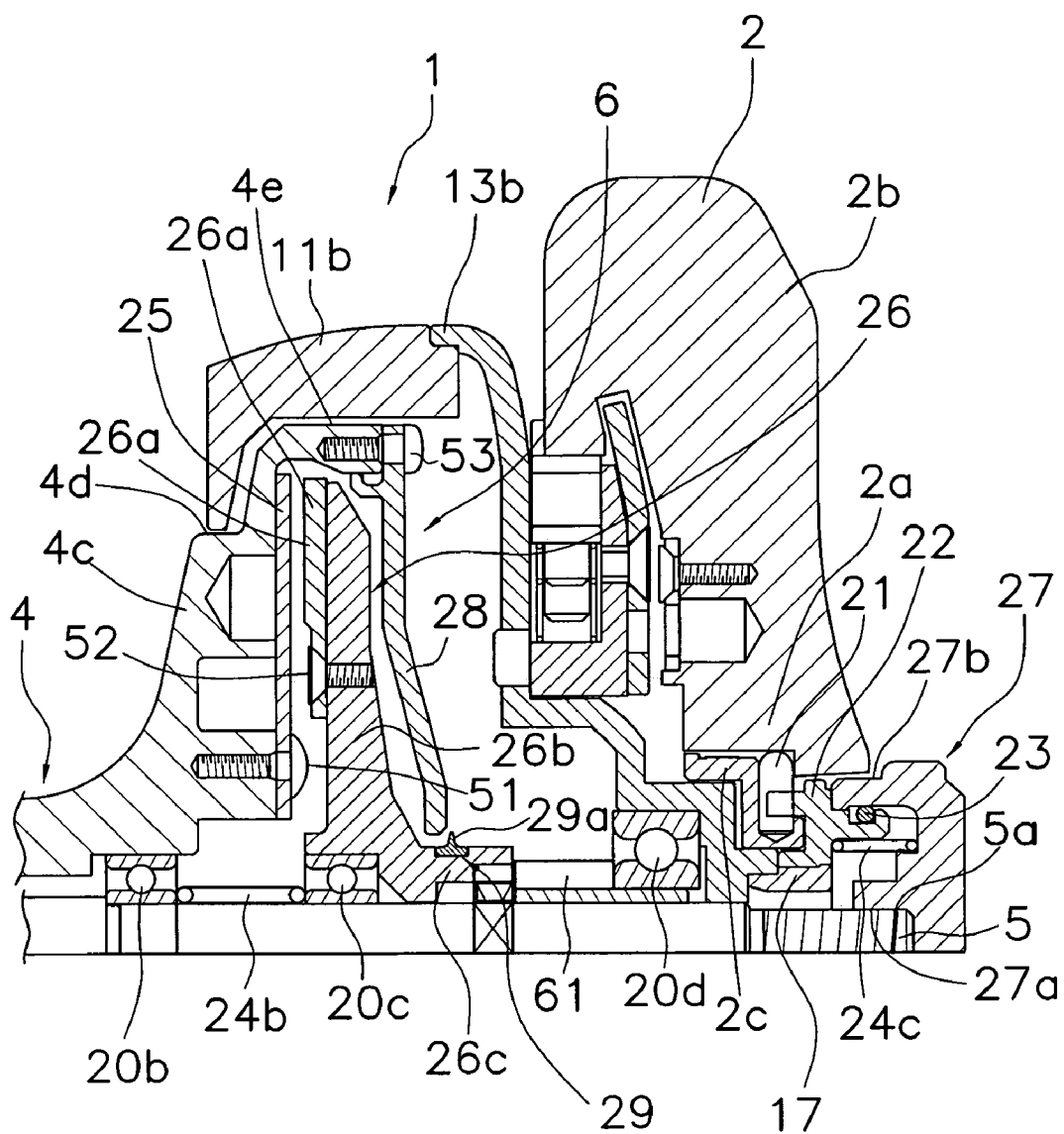
FIG. 7 is an enlarged cross-sectional view of a drag mechanism of the dual-bearing reel illustrated in FIG. 2 in accordance with the embodiment of the present invention.

Referring to FIGS. 2 and 7, the diameter of the second flange portion 4c is larger than the diameter of the first flange portion 4b. The second flange portion 4c has a cylindrical small diameter portion 4d and a cylindrical large diameter portion 4e. The small diameter portion 4d is formed integrally with the large diameter portion 4e. The diameter of the small diameter portion 4d is smaller than a diameter of the large diameter portion 4e and is provided so that a level difference is produced between the large diameter portion 4e and the end of the bobbin trunk 4a. In this case, when a fishing line is wound around the outer periphery of the bobbin trunk 4a, the level difference of the small diameter portion 4d allows the fishing line to be wound to the maximum outer diameter of the small diameter portion 4d. In addition, the second side plate 11b covers the spool 4 between the large diameter portion 4e and the small diameter portion 4d. A tip of the second side plate 11b extends radially inwardly so as to near the small diameter portion 4d. As a result, it is possible to prevent the fishing line from being wound around the outer periphery of the spool 4 beyond the small diameter portion 4d and to restrict axially outward movement of the fishing line.

As shown in FIG. 2, the diameter of the small diameter portion 4d is substantially the same as the diameter of the first flange portion 4b. The diameter of the large diameter portion 4e is in a range between about 110% or greater and about 140% or less of the diameter of the small diameter portion 4d. In this embodiment, it is preferably about 120% to 130% of the diameter of the small diameter portion 4d. In addition, the diameter of the large diameter portion 4e is substantially the same diameter as the diameter of the first side plate 11a and the first side cover 13a. Moreover, the outer diameter of the bobbin trunk 4a is about 30% to 40% of the diameter of the small diameter portion 4d.

Still referring to FIGS. 2 and 7, the drag mechanism 6 is a mechanism that changes and adjusts the braking force applied to the spool 4 in the line reel-out direction. The drag mechanism 6 has the drag control member 2, a plurality of first cam members 21, a second cam member 22, a drag adjustment member 27, a clip member 23, first, second and third urging members 24a, 24b and 24c, a first braking member 25 and a second braking member 26. The first cam members 21 are provided at an inner periphery of the drag control member 2. The second cam member 22 is provided so as to be in contact with the first cam members 21. The drag adjustment member 27 is mounted to the second cam member 22 rotatably relative to the second cam member 22. The drag adjustment member 27 pulls the spool shaft 5 outwardly (right side in FIG. 7). The clip member 23 retains the drag adjustment member 27 axially relative to the second cam member 22. The first urging member 24a is composed of four plate springs, for example, that axially inwardly urge the spool 4. The second urging member 24b is composed of a coil spring. The third urging member 24c is composed of a coil spring that axially outwardly (right side in FIG. 2) urges the drag adjustment member 27. The first braking member 25 is secured to the spool 4 at an axial outer surface of the spool 4. The second braking member 26 is provided so that it selectively contacts the first braking member 25. Additionally, the diameter of the first braking member 25 is in a range of about 90% or greater of the diameter of the small diameter portion 4d. In this embodiment, the diameter of the first braking member 25 is preferably about 130% to 140% of the diameter of the small diameter portion 4d. The cylindrical large diameter portion 4e has an outermost circumference that is larger than the first braking member 25. The cylindrical small diameter portion 4d has a diameter that is smaller than a diameter of the first braking member 25.

Referring to FIG. 2, the reel unit 1 is divided by an axis of the spool shaft 5. The upper half of the reel unit 1 (above the axis of the spool shaft 5) shows the axial direction arrangement in the case of a maximum drag operation. The lower half of the reel unit 1 (below the axis of the spool shaft 5) shows a drag force reduction arrangement.

Referring to FIGS. 7 and 8, the drag control member 2 includes a boss 2a and a lever portion 2b. The lever portion 2b radially outwardly extends from the boss 2a. The lever portion 2b interlocks with the second side cover 13b at a plurality of positions in a circumferential direction. The boss 2a is formed in a center of the drag control member 2. The boss 2a is rotatably supported by the second side cover 13b. In addition, the drag control member 2 further includes an attachment member 2c that attaches the first cam members 21. The attachment member 2c is secured to an inner periphery portion of the boss 2a non-rotatably relative to the boss 2a.

Referring to FIGS. 7 and 8, the first cam members 21 are rod-shaped cam pins that are secured to the attachment member 2c of the drag control member 2 at a plurality of locations. Preferably, the first cam members 21 are secured to the attachment member 2c at two locations, as shown in FIG. 8. Although the drag control member 2 is a member separated from the first cam member 21, it will be apparent to one of skill in the art from this disclosure that the first cam member 21 and the drag control member 2 can be integrally formed with each other.

The second cam member 22 is a cylindrical member that contacts the first cam members 21. The second cam member 22 is axially movable in response to the pivoting of the first cam members 21, i.e., the pivoting of the drag control member 2. The second cam member 22 is non-rotatable relative to the spool shaft 5. A shim 46 is attached between the attachment member 2c and a wall surface of the pivot support portion 34.

Figure 10:
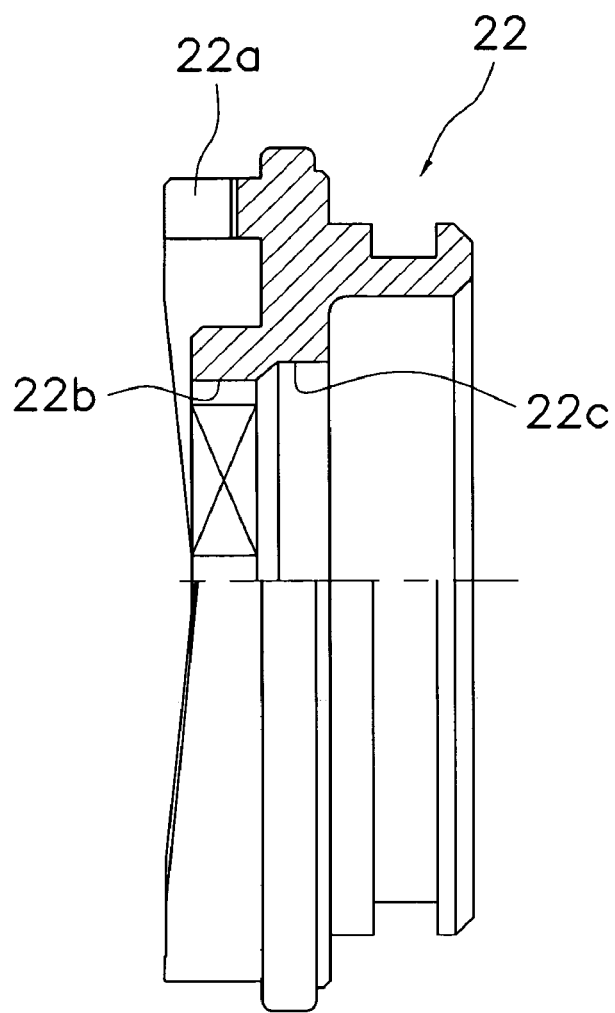
FIG. 10 is a sectional cross-sectional view of a second cam member of the dual-bearing reel illustrated in FIGS. 2, 7 and 8 in accordance with the embodiment of the present invention.
Figure 11:
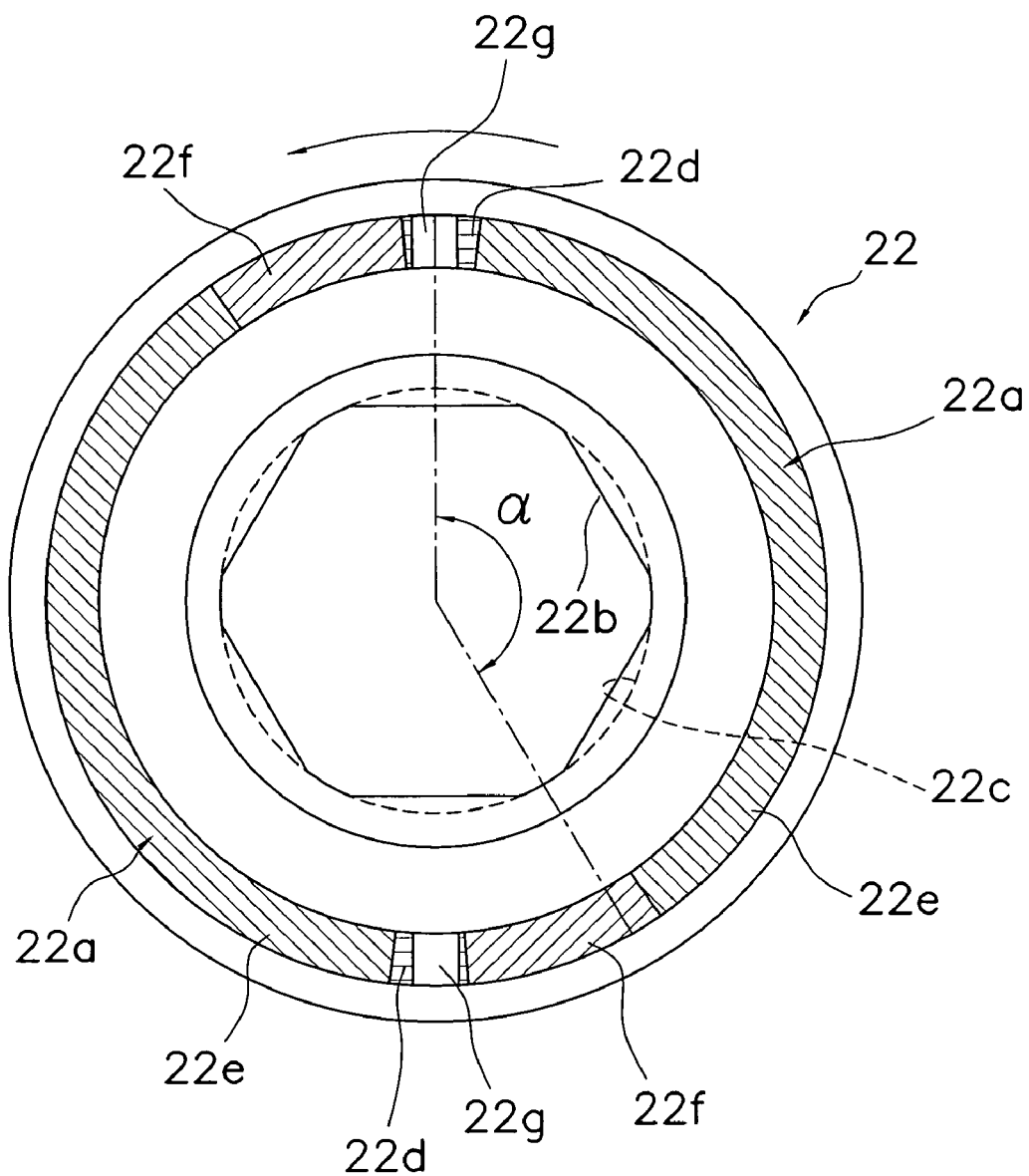
FIG. 11 is a front view of the second cam member illustrated in FIG. 10 in accordance with the embodiment of the present invention.

Referring to FIGS. 7, 8, 10 and 11, the second cam member 22 has a plurality of slant cams 22a with an inclined surface 22e. The inclined surface 22e is inclined along a circumferential direction. The inclined surface 22e is configured to be in contact with the first cam member 21. In FIG. 11, two slant cams 22a are arranged at a 180-degree rotational phase. Each slant cam 22a has a first flat surface portion 22d that is deeply recessed. The first flat surface portion 22d accommodates an arc-shaped recessed section 22g in which the first cam member 21 is provided during a drag release state. The inclined surface 22e has a height that gradually increases from the first flat surface portion 22d along the circumferential direction (the pivoting direction). A second flat surface portion 22f consists of a flat surface at a highest height position of the inclined surface 22e and generates the maximum drag force. The second flat surface portion 22f is formed to start from a position that is located slightly on a pivoting starting position (the formation position of the recessed section 22g) side relative to a position that is positioned at an angle α (for example, 150°) away from the pivoting starting position. The pivoting starting position is the maximum pivoting position of the drag control member 2.

In addition, an inner periphery of the second cam member 22 is non-rotatably and axially movably mounted to the guiding portion 17. As shown in FIGS. 10 and 11, the second cam member 22 has a hexagonal hole 22b and a round hole 22c. The round hole 22c is formed adjacent to the hexagonal hole 22b and is fitted in a circle 17c that connects the first through sixth arc-shaped parts 35b1–35b6 on an inner periphery of the circle 17c. Since the hexagonal hole 22b is formed by press forming, for example, it cannot have a large thickness (length in the axial direction) in consideration of precision. The hexagonal hole 22b engages with the first through sixth outer peripheral surces 35a1–35a6 and the first through sixth arc-shaped parts 35b1–35b6. If the second cam member 22 is non-rotatably and axially movably mounted to the guiding portion 17 by only the hexagonal hole 22b with a thin thickness, the second cam member 22 may wobble since the length in the axial direction is short. Accordingly, the first through sixth arc-shaped parts 35b1–35b6 are formed in the guiding portion 17. The hexagonal hole 22b is formed adjacent to the round hole 22c. Thus, a fit between the round hole 22c and the first through sixth arc-shaped parts 35b1–35b6 suppresses wobbling of the second cam member 22.

Although the round hole 22c is formed to reduce the wobbling of the second cam member 22, it will be apparent to one of skill in the art from this disclosure that the hexagonal hole 22b can compose a hole without the round hole 22c. In this case, it is not necessary to provide the first through sixth arc-shaped parts 35b1 to 35b6 in the hexagonal recessed section 37.

Pivoting the drag control member 2 in a counterclockwise direction in FIG. 1 moves the second cam member 22 toward the left side in the axial direction, as shown in the upper section of FIG. 8. Thus, the drag force is reduced when the drag control member 2 is pivoted counterclockwise. On the other hand, pivoting the drag control member 2 in the clockwise direction in FIG. 1 moves the second cam member 22 toward the right side in the axial direction, as shown in the lower section of FIG. 8. Thus, the drag force is increased when the drag control member 2 is pivoted clockwise.

The second cam member 22 is retained axially relative to the drag adjustment member 27 by the clip member 23. The clip member 23 is a resilient C-shaped clip ring made of a synthetic resin, for example. The clip member 23 contacts the outer peripheral surface of the second cam member 22 and the inner peripheral surface of the drag adjustment member 27. An outward opening force of the clip member 23 restricts axial movement of both the second cam member 22 and the drag adjustment member 27.

An attachment structure 45 of the drag control member 2 according to the present invention includes the second cam member 22, the guiding portion 17, the guide fastening portion 39 and the pivot support portion 34.

As shown in FIG. 8, the drag adjustment member 27 is a closed-ended cylindrical cap member. The drag adjustment member 27 is an adjustment member that initially sets the drag force. The drag adjustment member 27 is rotatably mounted to the second cam member 22. The drag adjustment member 27 pulls the spool shaft 5 axially outwardly (right side in FIG. 8) due to rotation of the screw. A female threaded portion 27a is formed in an inner periphery of the drag adjustment member 27. An end of the spool shaft 5 that protrudes outwardly from the second side cover 13b is screwed into the drag adjustment member 27. Specifically, a male threaded portion 5a is formed at the end of the spool shaft 5. The male threaded portion 5a is screwed into the female threaded portion 27a. The third urging member 24c is attached between the inner periphery of the drag adjustment member 27 and an axial end surface in the inner periphery of the second cam member 22 and normally urges the drag adjustment member 27 outwardly. Thus, it is possible to prevent wobbling of the second cam member 22. A stepped portion 27b is recessed in the drag adjustment member 27 and forms a groove along the circumferential direction in the outer periphery of the drag adjustment member 27. Seizing and axially outwardly (right side in FIG. 8) pulling the stepped portion 27b facilitates attachment/detachment of the drag adjustment member 27.

As shown in FIG. 2, the spool shaft 5 is supported to the reel unit 1 axially movably and non-rotatably relative thereto. The bearings 20a, 20b and 20c are mounted on the outer periphery of the spool shaft 5. As shown in FIGS. 2 and 7, the second urging member 24b is attached to the outer periphery of the spool shaft 5 between the bearings 20a and 20b. The second urging member 24b is composed of a coil spring that urges the spool 4 axially inwardly (left side in FIG. 2). In addition, as shown in FIG. 2, the first urging member 24a is composed of a disk spring that urges the spool 4 axially inwardly (left side in FIG. 2). The first urging member 24a is attached to the outer periphery of the spool shaft 5 axially inward of the bearing 20a. An urging force of the first urging member 24a is high as compared with an urging force of the second urging member 24b. For this reason, when the spool shaft 5 moves in the axial direction, the first urging member 24a is first to act and then, the second urging member 24b acts.

Moreover, a bearing 20d is mounted on the inner periphery of the second side cover 13b. Specifically, the bearing 20d is accommodated inside the large diameter protruding portion 34a. The bearing 20d supports the outer periphery of a pinion gear 61 mounted to the spool shaft 5 outer periphery. The pinion gear 61 meshes with the main gear 60 secured to the handle shaft 31, as shown in FIG. 2. The end of the pinion gear 61 is secured to the inner periphery side of the second braking member 26. As a result, the rotation from the handle 3 is transmitted to the first braking member 25 via the main gear 60, the pinion gear 61 and the second braking member 26. The rotation is then transmitted from the first braking member 25 to the spool 4, thereby rotating the spool 4.

The first braking member 25 is an annular member that is secured inside of the second side plate 11b at the axial outer surface (right side in FIG. 2) of the spool 4, as shown in FIGS. 2 and 7. The first braking member 25 is secured to the end surface of the spool 4 by a plurality of screw members 51. The first braking member 25 is made of a heat-resistant, synthetic resin such as a fiber reinforced resin. The resin is produced by impregnating a heat-resistant resin such as a phenol resin with a woven fabric of carbon fiber, for example.

Figure 12:
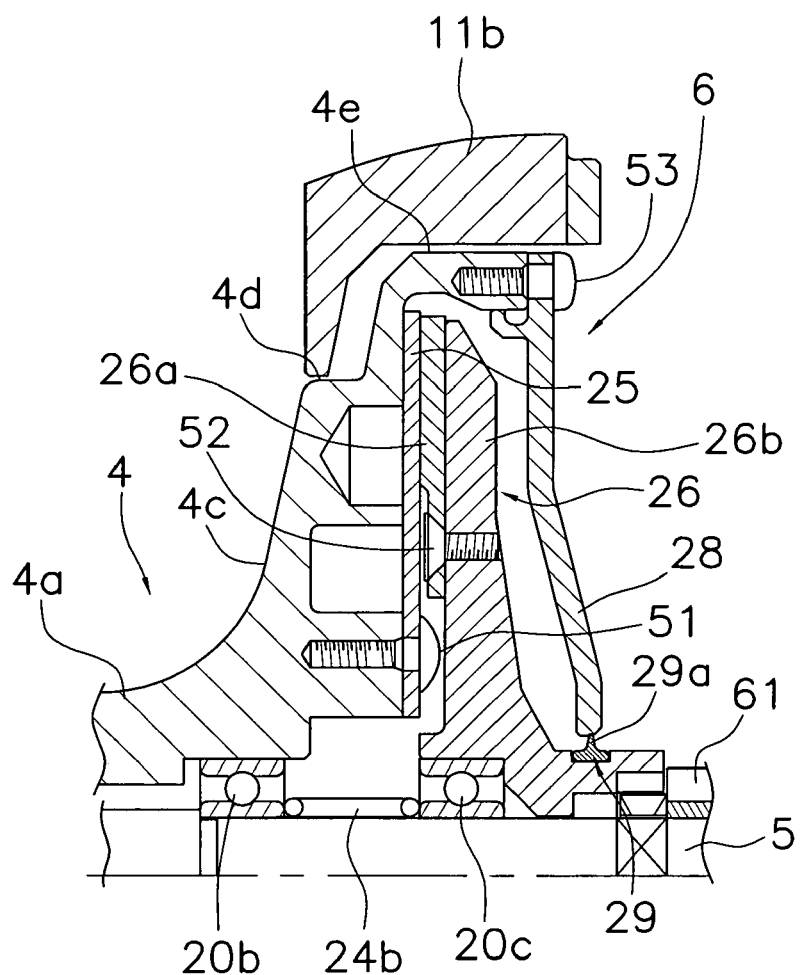
FIG. 12 is an enlarged cross-sectional view of first and second braking members of the dual-bearing reel illustrated in FIGS. 2 and 7.

As shown in FIGS. 7 and 12, the second braking member 26 includes a donut-shaped sliding disk 26a, a body member 26b and a boss 26c. The sliding disk 26a is configured to compressively contact the first braking member 25. The body member 26b is axially non-movably and rotatably mounted to the spool shaft 5. The sliding disk 26a is made of a heat-resistant and corrosion-resistant metal, such as stainless steel. The sliding disk 26a has a diameter slightly smaller than the diameter of the first braking member 25. The sliding disk 26a is secured to the body member 26b by a plurality of screw members 52. The body member 26b is a disk-shaped member with a boss 26c. The body member 26b is rotatably supported on the spool shaft 5 by the bearing 20c. The boss 26c meshes with the inner peripheral surface of the pinion gear 61. In addition, axial movement of the body member 26b (right side in FIG. 2) is restricted by the pinion gear 61 and the bearing 20d.

The outside of the first and second braking members 25 and 26 is covered by the cover disk 28. The cover disk 28 has an outer periphery that is secured to the axial outside end (right side in FIG. 2) of the large diameter portion 4e of the second flange portion 4c. The cover disk 28 is secured to an end of the large diameter portion 4e of the second flange portion 4c by a screw member 53. In addition, a seal member 29 with a lip 29a is provided on an outer periphery of the cover disk 28 and the boss portion 26c. Thus, an interior of the cover disk 28 is sealed. The lip 29a is configured not to be in contact with the cover disk 28 in a drag free state shown in FIG. 7. The lip 29a is configured to come in contact with the cover disk 28, thereby sealing the interior of the cover disk 28, when the first braking member 25 and the second braking member 26 contact each other by operation of the drag control member 2 as shown in FIG. 11. This reduces the rotation resistance of the spool 4 in the drag free state.

Figure 13:
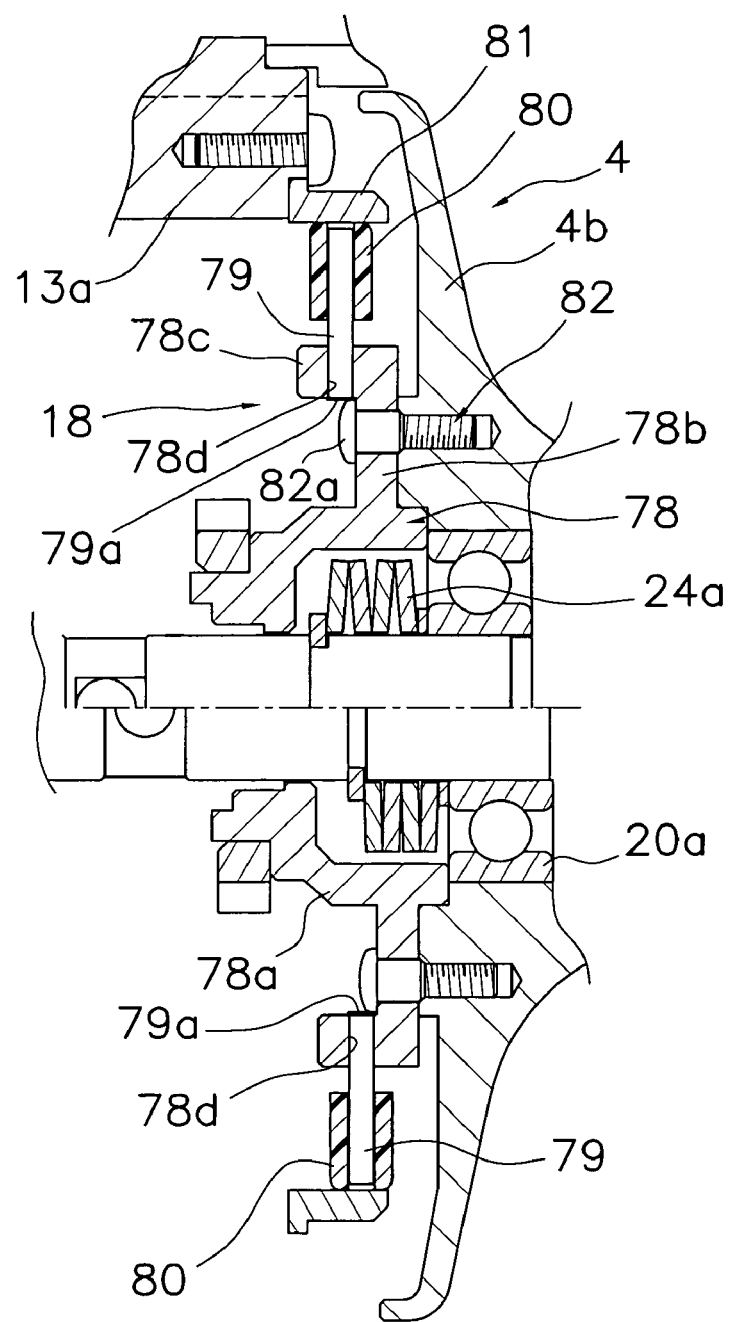
FIG. 13 is an enlarged cross-sectional view of a centrifugal braking mechanism of the dual-bearing reel illustrated in FIG. 2 in accordance with the embodiment of the present invention.

Referring to FIG. 13, a centrifugal braking mechanism 18 is provided in order to prevent line slack or backlash on the spool 4 from over rotation of the spool 4. The centrifugal braking mechanism 18 includes a rotation platform 78, a plurality of guide pins 79, a plurality of sliders 80 and a cylindrical brake liner 81. Preferably, the braking mechanism 18 has four guide pins 79 and four sliders 80. The cylindrical brake liner 81 is secured to an internal side surface of the first side cover 13a. The rotation platform 78 is secured to the outer side surface of the flange portion 4b of the spool. The four guide pins 79 stand radially on the rotation platform 78. The four sliders 80 are radially movably attached to the guide pins 79, for example. The rotation platform 78 is concentrically disposed with the spool 4. The rotation platform 78 is centered by joining an outer axial side surface of the flange portion 4b in a spigot joint. The rotation platform 78 is fastened by screw members 82.

The rotation platform 78 includes a first cylindrical portion 78a, a disk portion 78b, a second cylindrical portion 78c and a plurality of insertion holes 78d. The second cylindrical portion 78c is integrally formed with an outer periphery portion of the disk portion 78b. The first cylindrical portion 78a is disposed around the first urging member 24a. The disk portion 78b is formed integrally with an outer periphery surface of the first cylindrical portion 78a. The disk portion 78b is secured to the outer side surface of the flange portion 4b of the spool 4. Preferably, four insertion holes 78d receive the guide pins 79 inserted therein. The insertion holes 78d are formed in the second cylindrical portion 78c.

The guide pin 79 has a brim portion 79a with a large diameter at a base end of the guide pin 79. The guide pin 79 is inserted into the insertion holes 78d from an inner peripheral surface of the second cylindrical portion 78c. The guide pin 79 is retained by a head 82a of the screw member 82, which secures the rotation platform 78. Specifically, the head 82a of the screw member 82 is in contact with the brim portion 79a and thus, retains the guide pin 79 in the insertion hole 78d.

The slider 80 comes in contact with an inner peripheral surface of the annular brake liner 81 due to centrifugal force during rotation of the spool 4 and thereby brakes the spool 4.

Referring to FIG. 7, in assembling the second one-way clutch 63, the two connection pins 70 are attached to the rotation transmission hole 60a of the main gear 60, which is mounted to the handle shaft 31. Then, the ratchet wheel 65 is mounted to the rotation interlocking portion 31a. In this case, the ratchet wheel 65 is mounted to the rotation interlocking portion 31a so that the connection pins 70 are inserted into the rotation transmission holes 65c. Thus, the ratchet wheel 65 and the main gear 60 are non-rotatably connected to each other. After the ratchet wheel 65 is mounted, the urging member 67 is secured to the ratchet pawl 66 and is attached so as to grasp the outer periphery surface of the ratchet wheel 65. In this state, the fixing bracket 75 with the pivoting support pin 76 secured thereto is secured to the internal side surface of the bulging portion 15 by the screw members 77. In this case, the pivoting support pin 76 is inserted into the support hole 66a of the ratchet pawl 66. When the fixing bracket 75 is secured, the fixing bolt 69 is screwed into the shaft end portion 31b of the handle shaft 31 to secure the ratchet wheel 65. Accordingly, the main gear 60 is urged by the ratchet wheel 65. The main gear is thus, positioned and secured in the axial direction.

Additionally, for disassembly of the second one-way clutch 63, the above assembly procedure is conducted in reverse.

First, in a state where the second side cover 13b is removed from the frame 10, the screw members 77 are loosened. The fixing bracket 75 is then removed. In this case, even if the pivoting support pin 76 moves in the axial direction, the urging member 67 is in a stationary state relative to the ratchet wheel 65. Thus, the urging member 67 does not deform. When the fixing bracket 75 is removed, the pivoting support pin 76 is also removed from the ratchet pawl 66. Then, the fixing bolt 69 is removed to release the ratchet wheel 65. The ratchet pawl 66 is removed from the ratchet wheel 65 after the ratchet wheel 65 is removed from the handle shaft 31. In this disassembly procedure, since an abnormal force does not act on the urging member 67, the urging member 67 does not deform.

In this embodiment, since the head 69a of the fixing bolt 69 is exposed in a state where the fixing bracket 75 is attached, the fixing bolt 69 is capable of being loosened without removing the fixing bracket 75. For this reason, during disassembly of the second one-way clutch 63, the fixing bracket 75 and the ratchet wheel 65 are not removed separately. But after the screw members 77 are removed, the ratchet wheel 65 may also be removed together with the fixing bracket 75. In this case, since the pivoting support pin 76 and the ratchet pawl 66 do not move relative to each other, the urging member further reduces a tendency of deformation.

In the dual-bearing reel with this configuration, when the adjustable range of drag force of the drag mechanism 6 is adjusted, the drag adjustment member 27 is used. When rotated in the counterclockwise direction, the drag adjustment member 27 slightly moves toward the axial left side (see upper section of FIG. 2). Thus, the drag adjustment member 27 is shifted to slightly reduce the drag force in its adjusted range. On the other hand, when rotated in the clockwise direction, the drag adjustment member 27 slightly moves toward the axial right side (see lower section of FIG. 2). Thus, the drag adjustment member 27 is shifted to slightly increase the drag force in its adjusted range.

The drag control member 2 is pivoted to adjust the drag force of the drag mechanism 6. When the drag control member 2 is positioned at a pivoting position corresponding to the furthest handle end side in FIG. 1, the drag control member 2 is in a drag release position. In the drag release position, the first cam member 21 is disposed in the recessed portion 22g of the slant cam 22a. When the drag control member 2 is pivoted from the drag release position in the clockwise direction of FIG. 1, the first cam member 21 contacts the inclined surface 22e of the slant cam 22a. Accordingly, the second cam member 22 gradually moves outwardly in the spool axial direction (right side in FIG. 2). Thus, the spool shaft and the spool 4 gradually move rightward.

The first braking member 25 and the second braking member 26 then contact each other, as shown in FIG. 12, thereby generating the drag force. The generated drag force increases depending on the pivoting position of the drag control member 2 in the clockwise direction. When the first cam member 21 reaches the second flat surface portion 22f of the slant cam 22a, the drag force is at a maximum. When the drag control member 2 is pivoted in the clockwise direction, a repulsion force in the slant cam 22a transmits rotational force to the guiding portion 17 via the second cam member 22 in the clockwise direction (the direction shown by the arrow R in FIG. 6). Thus, the guiding portion 17 will rotate in a same direction.

In this case, as described above, in the hexagonal recessed section 37, a total of four parts that include the first and second contact parts 37c1 and 37c2 and parts 37a31 and 37a61 of the third and sixth inner peripheral surfaces 37a3 and 37a6 on the second and fifth inner periphery sides come in contact with the outer peripheral surface of the guiding portion 17. As a result, when a large torque is applied by the guiding portion 17, the number of the contact parts is greater and stable. Therefore, it is possible to reduce variation of contact parts between the hexagonal guiding portion 17 and the second side cover 13b.

On the other hand, when the drag control member 2 is operated to pivot in the opposite direction (the counterclockwise direction in FIG. 1), the first urging member 24a and the second urging member 24b urge the spool 4 and the spool shaft 5 leftward as viewed in FIG. 2. Thus, the drag force gradually decreases. The torque transmitted to the guiding portion 17 is weaker than in the case where the drag force is increased. In this case, only two parts 37a32 and 37a62 of the third and sixth inner peripheral surfaces 37a3 and 37a6 on the first and fourth inner periphery sides come in contact with the outer peripheral surface of the guiding portion 17.

As described above, in the hexagonal recessed section 37, the first and fourth inner peripheral surfaces 37a1 and 37a4 are separated away from the first and second outer peripheral surfaces 35a1 and 35a4. The first and second separated parts 37d1 and 37d2 are provided on the second and fifth inner peripheral surfaces 37a2 and 37a5. Thus, even if a cylindrical tool is used, such a tool can be relieved to these parts. The first and second contact parts 37c1 and 37c2, and the third and sixth inner peripheral surfaces 37a3 and 37a6 are precisely formed along the first and third parts 35a21 and 35a53 of the second and fifth outer peripheral surfaces 35a2 and 35a5 and the third and sixth outer peripheral surfaces 35a3 and 35a6 of the hexagon by a machining process. Additionally, the first and second contact parts 37c1 and 37c2 are disposed on the upstream side of the pivoting direction where the larger force is applied on the guiding portion 17. As a result, when the drag control member 2 is operated to pivot in this direction, the number of contact parts that contacts the drag control member 2 is greater than the number of contact parts in the case of the opposite direction.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents. Thus, the scope of the invention is not limited to the disclosed embodiment.

What is claimed is:

1. A drag control member attachment structure comprising:
    a first cam member including a drag control member attachment part;
    a second cam member configured to engage with the first cam member and move in a pivot axis direction in response to pivoting of the first cam member;
    a guiding portion including a hexagonal section having first through sixth outer peripheral surfaces that non-rotatably and movably guide the second cam member in the pivot axis direction;
    a guide fastening portion including a hexagonal recessed section that receives the hexagonal section of the guiding portion; and
    a pivot support portion disposed on an outer periphery side of the guide fastening portion,
    the hexagonal section including
        first and fourth inner peripheral surfaces spaced at intervals from the first outer peripheral surface and the fourth outer peripheral surface opposing the first outer peripheral surface, respectively,
        a second inner peripheral surface having a first contact part configured and arranged to be in contact with a first part on a side of the second outer peripheral surface adjacent to the first outer peripheral surface, and a first separated part disposed on a second part of a side adjacent to the second outer peripheral surface and spaced at an interval away from the second outer peripheral surface,
        third and sixth inner peripheral surfaces configured and arranged to be in contact with the third outer peripheral surface and the sixth outer peripheral surface opposing the third outer peripheral surface, and
        a fifth inner peripheral surface having a second contact part configured and arranged to be in contact with a third part on a side of the fifth outer peripheral surface adjacent to the fourth outer peripheral surface, and a second separated part disposed on a fourth part of a side adjacent to the fifth outer peripheral surface and spaced at an interval away from the fifth outer peripheral surface,
    the first through sixth inner peripheral surfaces being arranged along a pivoting direction.

2. The drag control member attachment structure as set forth in claim 1, wherein
    the first cam member includes a plurality of cam pins arranged along a radial direction of a pivot axis, and the second cam member includes a slant cam portion having an inclined surface that is inclined along a circumferential direction to engage with the cam pins, and a hexagonal hole disposed in an inner periphery of the second cam and configured to movably and non-rotatably engage the guiding portion in the axial direction.

3. The drag control member attachment structure as set forth in claim 2, wherein
the hexagonal section further includes first through sixth arc-shaped parts that connect adjacent the outer peripheral surfaces of the first through sixth outer peripheral surfaces with arcs centered at the center of the pivot axis, and the second cam further includes a circular hole that is formed on the inner periphery thereof adjacent to the hexagonal hole and is configured to receive the first through sixth arc-shaped parts.

4. The drag control member attachment structure as set forth in claim 1, wherein
the first separated part of the second inner peripheral surface and the second separated part of the fifth inner peripheral surface are formed in arc shapes, respectively.

5. The drag control member attachment structure as set forth in claim 1, wherein
the guiding portion further includes a cylindrical section disposed adjacent to the hexagonal section with a diameter smaller than an inscribed circle of the hexagonal section, and the guide fastening portion further includes a through hole that receives the cylindrical section, the guide fastening portion fastening the guiding portion.

6. The drag control member attachment structure as set forth in claim 5, wherein
the cylindrical section of the guiding portion includes a crimp section that is configured to pass through the through hole and protrude inwardly, and a tapered surface with an inner peripheral surface that expands toward an end of the cylindrical section, the crimp section having a portion that is crimped.

* * * * *